United States Patent
Rao et al.

(10) Patent No.: US 11,698,976 B2
(45) Date of Patent: Jul. 11, 2023

(54) DETERMINING APPLICATION ATTACK SURFACE FOR NETWORK APPLICATIONS

(71) Applicant: Cisco Technology, Inc., San Jose, CA (US)

(72) Inventors: Supreeth Hosur Nagesh Rao, Cupertino, CA (US); Navindra Yadav, Cupertino, CA (US); Prasannakumar Jobigenahally Malleshaiah, Sunnyvale, CA (US); Tapan Shrikrishna Patwardhan, Mountain View, CA (US); Umamaheswaran Arumugam, San Jose, CA (US); Darshan Shrinath Purandare, Fremont, CA (US); Aiyesha Ma, San Francisco, CA (US); Songlin Li, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 115 days.

(21) Appl. No.: 16/922,565

(22) Filed: Jul. 7, 2020

(65) Prior Publication Data
US 2022/0012340 A1    Jan. 13, 2022

(51) Int. Cl.
*H04L 29/00* (2006.01)
*G06F 21/57* (2013.01)
*H04L 9/40* (2022.01)

(52) U.S. Cl.
CPC ........ *G06F 21/577* (2013.01); *H04L 63/1433* (2013.01); *H04L 63/20* (2013.01); *G06F 2221/033* (2013.01)

(58) Field of Classification Search
CPC ............. G06F 21/577; G06F 2221/033; H04L 63/1433; H04L 63/20
See application file for complete search history.

(56) References Cited

U.S. PATENT DOCUMENTS

| | | | |
|---|---|---|---|
| 7,962,960 B2 | 6/2011 | Fudge | |
| 8,615,582 B2 | 12/2013 | McClure et al. | |
| 9,489,517 B2 | 11/2016 | Murthy | |

(Continued)

FOREIGN PATENT DOCUMENTS

| | | |
|---|---|---|
| CN | 105306414 | 2/2016 |
| EP | 3013016 A1 | 4/2016 |

OTHER PUBLICATIONS

International Search Report and Written Opinion from the International Searching Authority, dated Sep. 17, 2021, 13 pages, for corresponding International Patent Application No. PCT/US2021/038505.

(Continued)

*Primary Examiner* — Ghazal B Shehni
(74) *Attorney, Agent, or Firm* — Polsinelli

(57) ABSTRACT

Systems, methods, and computer-readable media for attack surface score computation can include the following processes. An attack surface score service receives information identifying open ports associated with an application. The attack surface score service determines an attack surface score for the application based on the information and common attack ports. A policy engine determines whether to implement a policy for reducing vulnerability of the application to attacks to yield a determination. The policy engine implements a vulnerability reduction policy based on the determination.

17 Claims, 7 Drawing Sheets

(56) References Cited

U.S. PATENT DOCUMENTS

| | | | |
|---|---|---|---|
| 10,454,963 B1* | 10/2019 | Smith | G06F 16/2477 |
| 2003/0154269 A1 | 8/2003 | Nyanchama et al. | |
| 2008/0046960 A1* | 2/2008 | Bade | G06F 9/5027 726/1 |
| 2015/0033349 A1 | 1/2015 | Oliphant et al. | |
| 2017/0359170 A1* | 12/2017 | Bower, III | H04L 9/0894 |
| 2018/0144139 A1* | 5/2018 | Cheng | H04W 4/70 |
| 2018/0260571 A1 | 9/2018 | Sanso et al. | |
| 2018/0278642 A1* | 9/2018 | Joy | H04L 63/1433 |
| 2019/0258804 A1* | 8/2019 | Glenn | H04L 63/1425 |
| 2020/0137103 A1* | 4/2020 | Ngo | G06F 40/20 |
| 2020/0396254 A1* | 12/2020 | Crabtree | G06F 16/2477 |

OTHER PUBLICATIONS

Manadhata, Pratyusa, et al., "An Attack Surface Metric," IEEE Transactions on Software Engineering, vol. 37, No. 3, May 1, 2011, pp. 371-386.

"Attack Surface Analysis Cheat Sheet—OWASP," Jul. 18, 2015, 6 pages.

* cited by examiner

# US 11,698,976 B2

DETERMINING APPLICATION ATTACK SURFACE FOR NETWORK APPLICATIONS

TECHNICAL FIELD

The subject matter of this disclosure relates in general to the field of workload security and computer networking, and more specifically to systems and methods for determining an attack surface score for a workload and determine a security policy to implement to reduce the vulnerability of the workload.

BACKGROUND

An enterprise application is a set of workloads (e.g., computing, networking, and storage) that are generally distributed across various nodes (or hosts) of a network. An objective of any given network operator or a fully autonomous network is to deter/prevent malicious attacks on network components and applications/workloads. One of the most common ways to attack a workload over the network is through open ports of the workload. Specifically, a workload is especially vulnerable to attacks if there is a vulnerable open port via which an application may be accessed.

BRIEF DESCRIPTION OF THE FIGURES

In order to describe the manner in which the above-recited and other advantages and features of the disclosure can be obtained, a more particular description of the principles briefly described above will be rendered by reference to specific embodiments that are illustrated in the appended drawings. Understanding that these drawings depict only embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
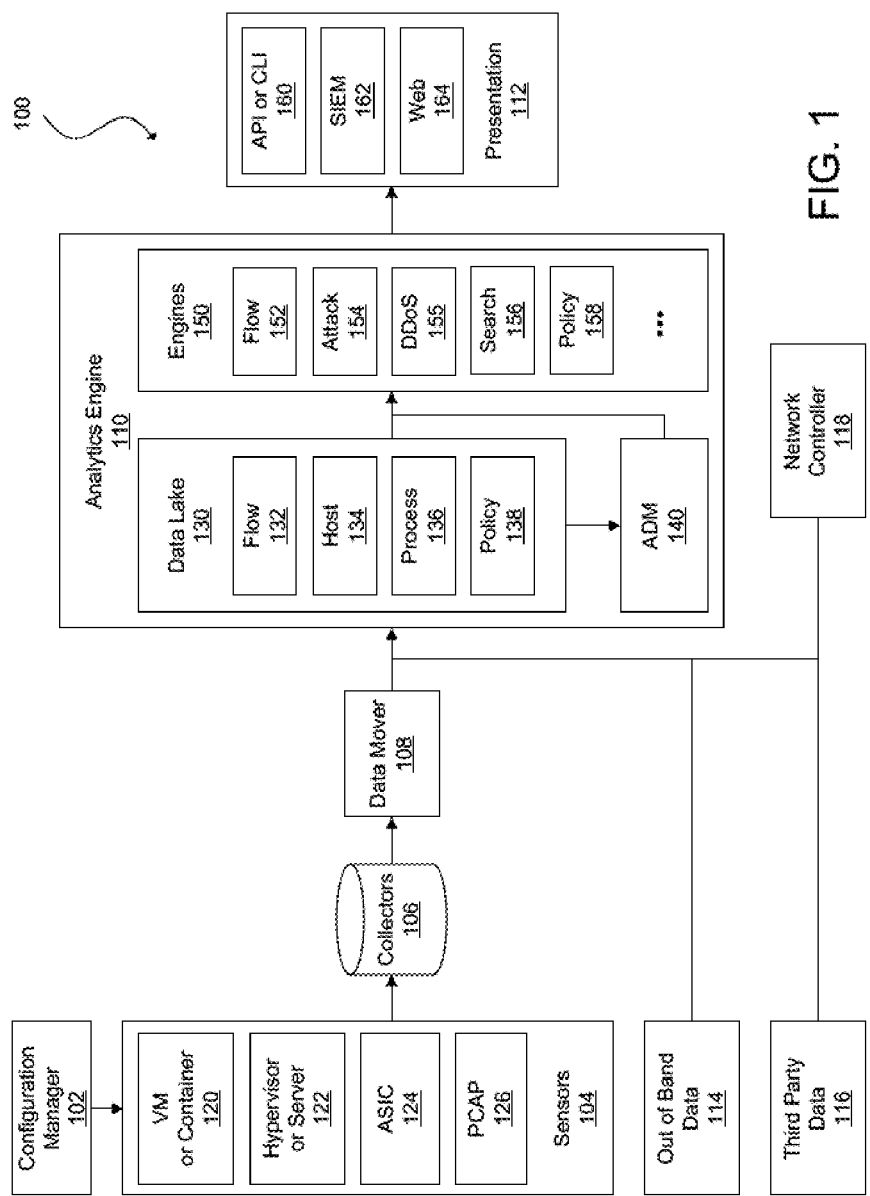
FIG. 1 illustrates an example of a network traffic monitoring system, according to one aspect of the present disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

As used herein the term "port" shall be used to refer to any communication endpoint that can transport network traffic in the network environment with respect to the data traffic both to and from that communication endpoint. Examples of such port include, but are not limited to layer 4/transport layer ports such as Transmission Control Protocol (TCP) port and the User Datagram Protocol (UDP), etc. In these examples, ports can be identified by port numbers, such as 16-bit numbers. Other examples include, but are not limited to, physical and/or virtual ports (connection ports) for network nodes on which a particular workload/application is being executed.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

Aspects of the present disclosure relate to attack surface score determination for applications running on a network based on relevant application information, and selection/adaptation of appropriate security polices based thereon. Such information, which will be further described below, include, but are not limited to, the number of open ports and unused open ports associated with an application, a vulnerability score of the application, a process hash evaluation of the application, and an allowed ports list of the application.

In one aspect, a method includes, receiving information identifying open ports associated with an application; determining based on the information and common attack ports, an attack surface score for the application; and determining whether to implement a policy for reducing vulnerability of the application to attacks to yield a determination; and implementing a vulnerability reduction policy based on the determination.

In another aspect, the information includes identification of open ports and used open ports associated with the application.

In another aspect, determining the attack surface score is based on the information and one or more unused ports from the common attack ports.

In another aspect, determining the attack surface score is further based on a common vulnerability score associated with the application.

In another aspect, the method further includes closing one or more open ports to yield updated information on open ports associated with the application; and determining an updated attack surface score based on the updated information.

In another aspect, the information is based on flow data of the application collected over a period of time, and the attack surface score is periodically determined.

In another aspect, the method further includes determining a weighted vulnerability score associated with a host on which the application is running, wherein the attack surface score is further based on the weighted vulnerability score of the host.

In one aspect, a non-transitory computer-readable storage medium including instructions which, when executed by one or more processors of an attack surface score computation system, cause the attack surface score computation system to: receive, by an attack surface score service, information identifying open ports associated with an application; determine, by the attack surface score service, based on the information and common attack ports, an attack surface score for the application; determine, by a policy engine, whether to implement a policy for reducing vulnerability of the application to attacks to yield a determination based on the attack surface score; and implement, by the policy engine, a vulnerability reduction policy based on the determination.

In one aspect, a non-transitory computer-readable storage medium including instructions which, when executed by one or more processors of an attack surface score computation system, cause the attack surface score computation system to: receive, by an attack surface score service, information identifying open ports associated with an application; determine, by the attack surface score service, based on the information and common attack ports, an attack surface score for the application; determine, by a policy engine, whether to implement a policy for reducing vulnerability of the application to attacks to yield a determination; and implement, by the policy engine, a vulnerability reduction policy based on the determination.

DESCRIPTION

Various embodiments of the disclosure are discussed in detail below. While specific implementations are discussed, it should be understood that this is done for illustrative purposes only. A person skilled in the relevant art will recognize that other components and configurations may be used without departing from the spirit and scope of the disclosure.

Detecting and/or prevent malicious attacks on network components and applications running thereon, is a universal objective for an enterprise network that ensures proper and efficient operation thereof. There are many network components and applications (and corresponding workloads) susceptible to potential malicious attacks. Providing an objective assessment of workload/application and network component (host) vulnerability to attacks can significantly improve the ability of detecting and preventing attacks on workloads and hosts in a given network.

The technology disclosed by the present disclosure improves application security by providing systems and methods for determination of attack surface scores. A single objective score is determined to help the user to quantify how vulnerable a particular workload is (and identify which specific port(s) is/are vulnerable). Information about a workload such as the number of open ports, the number of unused open ports, and the number of unused common attack ports are used to determine an attack surface score for a particular workload. The lower the score the wider the attack surface (the more susceptible the workload is to an attack). The process will be fully described below.

The disclosure begins with a description of examples of network monitoring system and example network environment in which concepts of application placement, as mentioned above, may be deployed.

Referring now to the drawings, FIG. 1 is an illustration of a network traffic monitoring system 100, according to one aspect of the present disclosure. The network traffic monitoring system 100 can include a configuration manager 102, sensors 104, a collector module 106, a data mover module 108, an analytics engine 110, and a presentation module 112. In FIG. 1, the analytics engine 110 is also shown in communication with out-of-band data sources 114, third party data sources 116, and a network controller 118.

The configuration manager 102 can be used to provision and maintain the sensors 104, including installing sensor software or firmware in various nodes of a network, configuring the sensors 104, updating the sensor software or firmware, among other sensor management tasks. For example, the sensors 104 can be implemented as virtual partition images (e.g., virtual machine (VM) images or container images), and the configuration manager 102 can distribute the images to host machines. In general, a virtual partition may be an instance of a VM, container, sandbox, or other isolated software environment. The software environment may include an operating system and application software. For software running within a virtual partition, the virtual partition may appear to be, for example, one of many servers or one of many operating systems executed on a single physical server. The configuration manager 102 can instantiate a new virtual partition or migrate an existing partition to a different physical server. The configuration manager 102 can also be used to configure the new or migrated sensor.

The configuration manager 102 can monitor the health of the sensors 104. For example, the configuration manager 102 may request for status updates and/or receive heartbeat messages, initiate performance tests, generate health checks, and perform other health monitoring tasks. In some embodiments, the configuration manager 102 can also authenticate the sensors 104. For instance, the sensors 104 can be assigned a unique identifier, such as by using a one-way hash function of a sensor's basic input/out system (BIOS) universally unique identifier (UUID) and a secret key stored by the configuration image manager 102. The UUID can be a large number that may be difficult for a malicious sensor or other device or component to guess. In some embodiments, the configuration manager 102 can keep the sensors 104 up to date by installing the latest versions of sensor software and/or applying patches. The configuration manager 102 can obtain these updates automatically from a local source or the Internet.

The sensors 104 can reside on various nodes of a network, such as a virtual partition (e.g., VM or container) 120; a hypervisor or shared kernel managing one or more virtual partitions and/or physical servers 122, an application-specific integrated circuit (ASIC) 124 of a switch, router, gateway, or other networking device, or a packet capture (pcap) 126 appliance (e.g., a standalone packet monitor, a device connected to a network devices monitoring port, a device connected in series along a main trunk of a datacenter, or similar device), or other element of a network. The sensors 104 can monitor network traffic between nodes, and send network traffic data and corresponding data (e.g., host data, process data, user data, etc.) to the collectors 106 for storage. For example, the sensors 104 can sniff packets being sent over its hosts' physical or virtual network interface card (NIC), or individual processes can be configured to report network traffic and corresponding data to the sensors 104. Incorporating the sensors 104 on multiple nodes and within multiple partitions of some nodes of the network can provide for robust capture of network traffic and corresponding data from each hop of data transmission. In some embodiments, each node of the network (e.g., VM, container, or other virtual partition 120, hypervisor, shared kernel, or physical server 122, ASIC 124, pcap 126, etc.) includes a respective sensor 104. However, it should be understood that various software and hardware configurations can be used to implement the sensor network 104.

As the sensors 104 capture communications and corresponding data, they may continuously send network traffic data to the collectors 106. The network traffic data can include metadata relating to a packet, a collection of packets, a flow, a bidirectional flow, a group of flows, a session, or a network communication of another granularity. That is, the network traffic data can generally include any information describing communication on all layers of the Open Systems Interconnection (OSI) model. For example, the network traffic data can include source/destination MAC address, source/destination IP address, protocol, port number, etc. In some embodiments, the network traffic data can also include summaries of network activity or other network statistics such as number of packets, number of bytes, number of flows, bandwidth usage, response time, latency, packet loss, jitter, and other network statistics.

The sensors 104 can also determine additional data for each session, bidirectional flow, flow, packet, or other more granular or less granular network communication. The additional data can include host and/or endpoint information, virtual partition information, sensor information, process information, user information, tenant information, application information, network topology, application dependency mapping, cluster information, or other information corresponding to each flow.

In some embodiments, the sensors 104 can perform some preprocessing of the network traffic and corresponding data before sending the data to the collectors 106. For example, the sensors 104 can remove extraneous or duplicative data or they can create summaries of the data (e.g., latency, number of packets per flow, number of bytes per flow, number of flows, etc.). In some embodiments, the sensors 104 can be configured to only capture certain types of network information and disregard the rest. In some embodiments, the sensors 104 can be configured to capture only a representative sample of packets (e.g., every 1,000th packet or other suitable sample rate) and corresponding data.

Since the sensors 104 may be located throughout the network, network traffic and corresponding data can be collected from multiple vantage points or multiple perspectives in the network to provide a more comprehensive view of network behavior. The capture of network traffic and corresponding data from multiple perspectives rather than just at a single sensor located in the data path or in communication with a component in the data path, allows the data to be correlated from the various data sources, which may be used as additional data points by the analytics engine 110. Further, collecting network traffic and corresponding data from multiple points of view ensures more accurate data is captured. For example, other types of sensor networks may be limited to sensors running on external-facing network devices (e.g., routers, switches, network appliances, etc.) such that east-west traffic, including VM-to-VM or container-to-container traffic on a same host, may not be monitored. In addition, packets that are dropped before traversing a network device or packets containing errors may not be accurately monitored by other types of sensor networks. The sensor network 104 of various embodiments substantially mitigates or eliminates these issues altogether by locating sensors at multiple points of potential failure. Moreover, the network traffic monitoring system 100 can verify multiple instances of data for a flow (e.g., source endpoint flow data, network device flow data, and endpoint flow data) against one another.

In some embodiments, the network traffic monitoring system 100 can assess a degree of accuracy of flow data sets from multiple sensors and utilize a flow data set from a single sensor determined to be the most accurate and/or complete. The degree of accuracy can be based on factors such as network topology (e.g., a sensor closer to the source may be more likely to be more accurate than a sensor closer to the destination), a state of a sensor or a node hosting the sensor (e.g., a compromised sensor/node may have less accurate flow data than an uncompromised sensor/node), or flow data volume (e.g., a sensor capturing a greater number of packets for a flow may be more accurate than a sensor capturing a smaller number of packets).

In some embodiments, the network traffic monitoring system 100 can assemble the most accurate flow data set and corresponding data from multiple sensors. For instance, a first sensor along a data path may capture data for a first packet of a flow but may be missing data for a second packet of the flow while the situation is reversed for a second sensor along the data path. The network traffic monitoring system 100 can assemble data for the flow from the first packet captured by the first sensor and the second packet captured by the second sensor.

As discussed, the sensors 104 can send network traffic and corresponding data to the collectors 106. In some embodiments, each sensor can be assigned to a primary collector and a secondary collector as part of a high availability scheme. If the primary collector fails or communications between the sensor and the primary collector are not otherwise possible, a sensor can send its network traffic and corresponding data to the secondary collector. In other embodiments, the sensors 104 are not assigned specific collectors but the network traffic monitoring system 100 can determine an optimal collector for receiving the network traffic and corresponding data through a discovery process. In such embodiments, a sensor can change where it sends its network traffic and corresponding data if its environments changes, such as if a default collector fails or if the sensor is migrated to a new location and it would be optimal for the sensor to send its data to a different collector. For example, it may be preferable for the sensor to send its network traffic and corresponding data on a particular path and/or to a particular collector based on latency, shortest path, monetary cost (e.g., using private resources versus a public resources provided by a public cloud provider), error rate, or some combination of these factors. In other embodiments, a sensor can send different types of network traffic and corresponding data to different collectors. For example, the sensor can send first network traffic and corresponding data related to one type of process to one collector and second network traffic and corresponding data related to another type of process to another collector.

The collectors 106 can be any type of storage medium that can serve as a repository for the network traffic and corresponding data captured by the sensors 104. In some embodiments, data storage for the collectors 106 is located in an in-memory database, such as dashDB from IBM®, although it should be appreciated that the data storage for the collectors 106 can be any software and/or hardware capable of providing rapid random access speeds typically used for analytics software. In various embodiments, the collectors 106 can utilize solid state drives, disk drives, magnetic tape drives, or a combination of the foregoing according to cost, responsiveness, and size requirements. Further, the collectors 106 can utilize various database structures such as a normalized relational database or a NoSQL database, among others.

In some embodiments, the collectors 106 may only serve as network storage for the network traffic monitoring system 100. In such embodiments, the network traffic monitoring system 100 can include a data mover module 108 for retrieving data from the collectors 106 and making the data available to network clients, such as the components of the analytics engine 110. In effect, the data mover module 108 can serve as a gateway for presenting network-attached storage to the network clients. In other embodiments, the collectors 106 can perform additional functions, such as organizing, summarizing, and preprocessing data. For example, the collectors 106 can tabulate how often packets of certain sizes or types are transmitted from different nodes of the network. The collectors 106 can also characterize the traffic flows going to and from various nodes. In some embodiments, the collectors 106 can match packets based on sequence numbers, thus identifying traffic flows and connection links. As it may be inefficient to retain all data indefinitely in certain circumstances, in some embodiments, the collectors 106 can periodically replace detailed network traffic data with consolidated summaries. In this manner, the collectors 106 can retain a complete dataset describing one period (e.g., the past minute or other suitable period of time), with a smaller dataset of another period (e.g., the previous 2-10 minutes or other suitable period of time), and progressively consolidate network traffic and corresponding data of other periods of time (e.g., day, week, month, year, etc.). In some embodiments, network traffic and corresponding data for a set of flows identified as normal or routine can be winnowed at an earlier period of time while a more complete data set may be retained for a lengthier period of time for another set of flows identified as anomalous or as an attack.

Computer networks may be exposed to a variety of different attacks that expose vulnerabilities of computer systems in order to compromise their security. Some network traffic may be associated with malicious programs or devices. The analytics engine 110 may be provided with examples of network states corresponding to an attack and network states corresponding to normal operation. The analytics engine 110 can then analyze network traffic and corresponding data to recognize when the network is under attack. In some embodiments, the network may operate within a trusted environment for a period of time so that the analytics engine 110 can establish a baseline of normal operation. Since malware is constantly evolving and changing, machine learning may be used to dynamically update models for identifying malicious traffic patterns.

In some embodiments, the analytics engine 110 may be used to identify observations which differ from other examples in a dataset. For example, if a training set of example data with known outlier labels exists, supervised anomaly detection techniques may be used. Supervised anomaly detection techniques utilize data sets that have been labeled as normal and abnormal and train a classifier. In a case in which it is unknown whether examples in the training data are outliers, unsupervised anomaly techniques may be used. Unsupervised anomaly detection techniques may be used to detect anomalies in an unlabeled test data set under the assumption that the majority of instances in the data set are normal by looking for instances that seem to fit to the remainder of the data set.

The analytics engine 110 can include a data lake 130, an application dependency mapping (ADM) module 140, and elastic processing engines 150. The data lake 130 is a large-scale storage repository that provides massive storage for various types of data, enormous processing power, and the ability to handle nearly limitless concurrent tasks or jobs. In some embodiments, the data lake 130 is implemented using the Hadoop® Distributed File System (HDFS™) from Apache® Software Foundation of Forest Hill, Md. HDFS™ is a highly scalable and distributed file system that can scale to thousands of cluster nodes, millions of files, and petabytes of data. HDFS™ is optimized for batch processing where data locations are exposed to allow computations to take place where the data resides. HDFS™ provides a single namespace for an entire cluster to allow for data coherency in a write-once, read-many access model. That is, clients can only append to existing files in the node. In HDFS™, files are separated into blocks, which are typically 64 MB in size and are replicated in multiple data nodes. Clients access data directly from data nodes.

In some embodiments, the data mover 108 receives raw network traffic and corresponding data from the collectors 106 and distributes or pushes the data to the data lake 130. The data lake 130 can also receive and store out-of-band data 114, such as statuses on power levels, network availability, server performance, temperature conditions, cage door positions, and other data from internal sources, and third party data 116, such as security reports (e.g., provided by Cisco® Systems, Inc. of San Jose, Calif., Arbor Networks® of Burlington, Mass., Symantec® Corp. of Sunnyvale, Calif., Sophos® Group plc of Abingdon, England, Microsoft® Corp. of Seattle, Wash., Verizon® Communications, Inc. of New York, N.Y., among others), geolocation data, IP watch lists, Whois data, configuration management database (CMDB) or configuration management system (CMS) as a service, and other data from external sources. In other embodiments, the data lake 130 may instead fetch or pull raw traffic and corresponding data from the collectors 106 and relevant data from the out-of-band data sources 114 and the third party data sources 116. In yet other embodiments, the functionality of the collectors 106, the data mover 108, the out-of-band data sources 114, the third party data sources 116, and the data lake 130 can be combined. Various combinations and configurations are possible as would be known to one of ordinary skill in the art.

Each component of the data lake 130 can perform certain processing of the raw network traffic data and/or other data (e.g., host data, process data, user data, out-of-band data or third party data) to transform the raw data to a form useable by the elastic processing engines 150. In some embodiments, the data lake 130 can include repositories for flow attributes 132, host and/or endpoint attributes 134, process attributes 136, and policy attributes 138. In some embodiments, the data lake 130 can also include repositories for VM or container attributes, application attributes, tenant attributes, network topology, application dependency maps, cluster attributes, etc.

The flow attributes 132 relate to information about flows traversing the network. A flow is generally one or more packets sharing certain attributes that are sent within a network within a specified period of time. The flow attributes 132 can include packet header fields such as a source address (e.g., Internet Protocol (IP) address, Media Access Control (MAC) address, Domain Name System (DNS) name, or other network address), source port, destination address, destination port, protocol type, class of service, among other fields. The source address may correspond to a first endpoint (e.g., network device, physical server, virtual partition, etc.) of the network, and the destination address may correspond to a second endpoint, a multicast group, or a broadcast domain. The flow attributes 132 can also include aggregate packet data such as flow start time, flow end time, number of packets for a flow, number of bytes for a flow, the union of TCP flags for a flow, among other flow data.

The host and/or endpoint attributes 134 describe host and/or endpoint data for each flow, and can include host and/or endpoint name, network address, operating system, CPU usage, network usage, disk space, ports, logged users, scheduled jobs, open files, and information regarding files and/or directories stored on a host and/or endpoint (e.g., presence, absence, or modifications of log files, configuration files, device special files, or protected electronic information). As discussed, in some embodiments, the host and/or endpoints attributes 134 can also include the out-of-band data 114 regarding hosts such as power level, temperature, and physical location (e.g., room, row, rack, cage door position, etc.) or the third party data 116 such as whether a host and/or endpoint is on an IP watch list or otherwise associated with a security threat, Whois data, or geocoordinates. In some embodiments, the out-of-band data 114 and the third party data 116 may be associated by process, user, flow, or other more granular or less granular network element or network communication.

The process attributes 136 relate to process data corresponding to each flow, and can include process name (e.g., bash, httpd, netstat, etc.), ID, parent process ID, path (e.g., /usr2/username/bin/, /usr/local/bin, /usr/bin, etc.), CPU utilization, memory utilization, memory address, scheduling information, nice value, flags, priority, status, start time, terminal type, CPU time taken by the process, the command that started the process, and information regarding a process owner (e.g., user name, ID, user's real name, e-mail address, user's groups, terminal information, login time, expiration date of login, idle time, and information regarding files and/or directories of the user).

The policy attributes 138 contain information relating to network policies. Policies establish whether a particular flow is allowed or denied by the network as well as a specific route by which a packet traverses the network. Policies can also be used to mark packets so that certain kinds of traffic receive differentiated service when used in combination with queuing techniques such as those based on priority, fairness, weighted fairness, token bucket, random early detection, round robin, among others. The policy attributes 138 can include policy statistics such as a number of times a policy was enforced or a number of times a policy was not enforced. The policy attributes 138 can also include associations with network traffic data. For example, flows found to be non-conformant can be linked or tagged with corresponding policies to assist in the investigation of non-conformance.

The analytics engine 110 may include any number of engines 150, including for example, a flow engine 152 for identifying flows (e.g., flow engine 152) or an attacks engine 154 for identify attacks to the network. In some embodiments, the analytics engine can include a separate distributed denial of service (DDoS) attack engine 155 for specifically detecting DDoS attacks. In other embodiments, a DDoS attack engine may be a component or a sub-engine of a general attacks engine. In some embodiments, the attacks engine 154 and/or the DDoS engine 155 can use machine learning techniques to identify security threats to a network. For example, the attacks engine 154 and/or the DDoS engine 155 can be provided with examples of network states corresponding to an attack and network states corresponding to normal operation. The attacks engine 154 and/or the DDoS engine 155 can then analyze network traffic data to recognize when the network is under attack. In some embodiments, the network can operate within a trusted environment for a time to establish a baseline for normal network operation for the attacks engine 154 and/or the DDoS.

The analytics engine 110 may further include a search engine 156. The search engine 156 may be configured, for example to perform a structured search, an NLP (Natural Language Processing) search, or a visual search. Data may be provided to the engines from one or more processing components.

The analytics engine 110 can also include a policy engine 158 that manages network policy, including creating and/or importing policies, monitoring policy conformance and non-conformance, enforcing policy, simulating changes to policy or network elements affecting policy, among other policy-related tasks.

The ADM module 140 can determine dependencies of applications of the network. That is, particular patterns of traffic may correspond to an application, and the interconnectivity or dependencies of the application can be mapped to generate a graph for the application (i.e., an application dependency mapping). In this context, an application refers to a set of networking components that provides connectivity for a given set of workloads. For example, in a three-tier architecture for a web application, first endpoints of the web tier, second endpoints of the application tier, and third endpoints of the data tier make up the web application. The ADM module 140 can receive input data from various repositories of the data lake 130 (e.g., the flow attributes 132, the host and/or endpoint attributes 134, the process attributes 136, etc.). The ADM module 140 may analyze the input data to determine that there is first traffic flowing between external endpoints on port 80 of the first endpoints corresponding to Hypertext Transfer Protocol (HTTP)

requests and responses. The input data may also indicate second traffic between first ports of the first endpoints and second ports of the second endpoints corresponding to application server requests and responses and third traffic flowing between third ports of the second endpoints and fourth ports of the third endpoints corresponding to database requests and responses. The ADM module 140 may define an ADM for the web application as a three-tier application including a first EPG comprising the first endpoints, a second EPG comprising the second endpoints, and a third EPG comprising the third endpoints.

The presentation module 112 can include an application programming interface (API) or command line interface (CLI) 160, a security information and event management (SIEM) interface 162, and a web front-end 164. As the analytics engine 110 processes network traffic and corresponding data and generates analytics data, the analytics data may not be in a human-readable form or it may be too voluminous for a user to navigate. The presentation module 112 can take the analytics data generated by analytics engine 110 and further summarize, filter, and organize the analytics data as well as create intuitive presentations for the analytics data.

In some embodiments, the API or CLI 160 can be implemented using Hadoop® Hive from Apache® for the back end, and Java® Database Connectivity (JDBC) from Oracle® Corporation of Redwood Shores, Calif., as an API layer. Hive is a data warehouse infrastructure that provides data summarization and ad hoc querying. Hive provides a mechanism to query data using a variation of structured query language (SQL) that is called HiveQL. JDBC is an application programming interface (API) for the programming language Java®, which defines how a client may access a database.

In some embodiments, the SIEM interface 162 can be implemented using Kafka for the back end, and software provided by Splunk®, Inc. of San Francisco, Calif. as the SIEM platform. Kafka is a distributed messaging system that is partitioned and replicated. Kafka uses the concept of topics. Topics are feeds of messages in specific categories. In some embodiments, Kafka can take raw packet captures and telemetry information from the data mover 108 as input, and output messages to a SIEM platform, such as Splunk®. The Splunk® platform is utilized for searching, monitoring, and analyzing machine-generated data.

In some embodiments, the web front-end 164 can be implemented using software provided by MongoDB®, Inc. of New York, N.Y. and Hadoop® ElasticSearch from Apache® for the back-end, and Ruby on Rails™ as the web application framework. MongoDB® is a document-oriented NoSQL database based on documents in the form of JavaScript® Object Notation (JSON) with dynamic schemas. ElasticSearch is a scalable and real-time search and analytics engine that provides domain-specific language (DSL) full querying based on JSON. Ruby on Rails™ is model-view-controller (MVC) framework that provides default structures for a database, a web service, and web pages. Ruby on Rails™ relies on web standards such as JSON or extensible markup language (XML) for data transfer, and hypertext markup language (HTML), cascading style sheets, (CSS), and JavaScript® for display and user interfacing.

Although FIG. 1 illustrates an example configuration of the various components of a network traffic monitoring system, those of skill in the art will understand that the components of the network traffic monitoring system 100 or any system described herein can be configured in a number of different ways and can include any other type and number of components. For example, the sensors 104, the collectors 106, the data mover 108, and the data lake 130 can belong to one hardware and/or software module or multiple separate modules. Other modules can also be combined into fewer components and/or further divided into more components.

Figure 2:
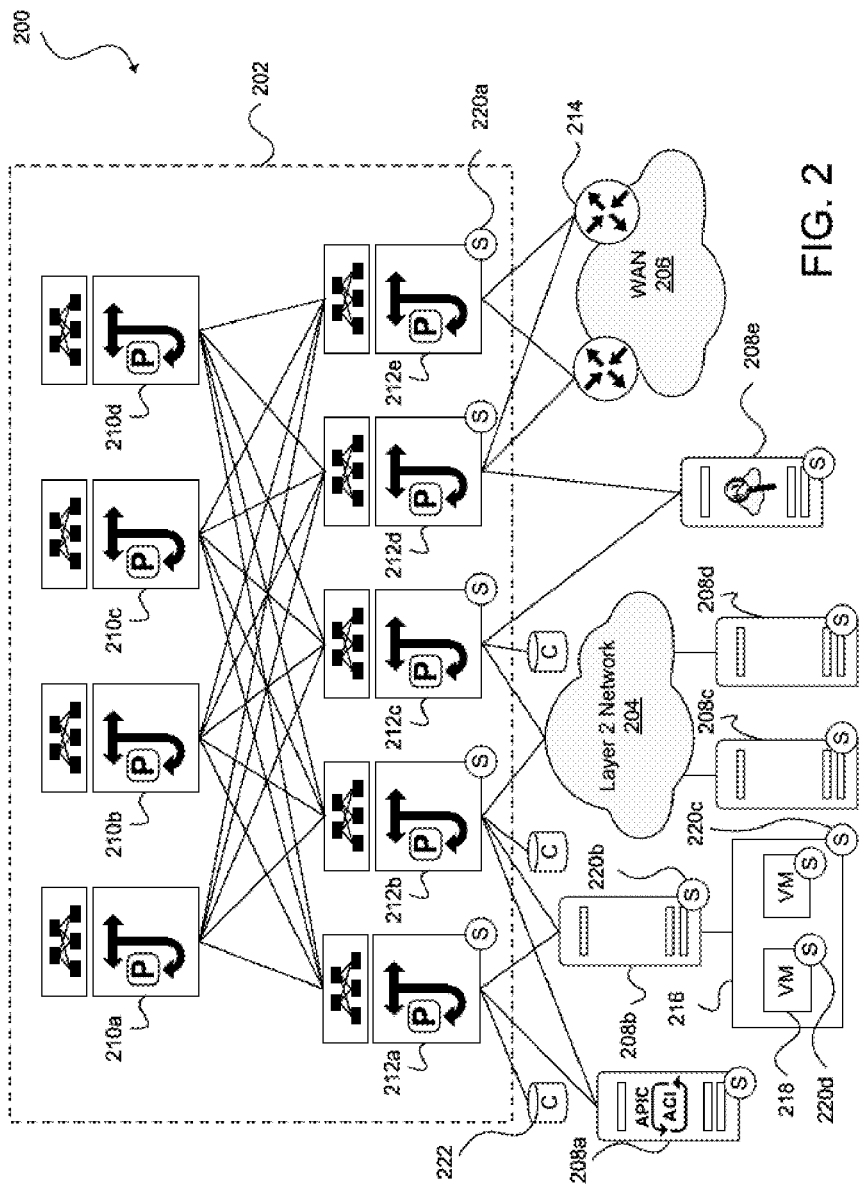
FIG. 2 illustrates an example of a network environment, according to one aspect of the present disclosure.

FIG. 2 illustrates an example of a network environment 200, according to one aspect of the present disclosure. In some embodiments, a network traffic monitoring system, such as the network traffic monitoring system 100 of FIG. 1, can be implemented in the network environment 200. It should be understood that, for the network environment 200 and any environment discussed herein, there can be additional or fewer nodes, devices, links, networks, or components in similar or alternative configurations. Embodiments with different numbers and/or types of clients, networks, nodes, cloud components, servers, software components, devices, virtual or physical resources, configurations, topologies, services, appliances, deployments, or network devices are also contemplated herein. Further, the network environment 200 can include any number or type of resources, which can be accessed and utilized by clients or tenants. The illustrations and examples provided herein are for clarity and simplicity.

The network environment 200 can include a network fabric 202, a Layer 2 (L2) network 204, a Layer 3 (L3) network 206, and servers 208*a*, 208*b*, 208*c*, 208*d*, and 208*e* (collectively, 208). The network fabric 202 can include spine switches 210*a*, 210*b*, 210*c*, and 210*d* (collectively, "210") and leaf switches 212*a*, 212*b*, 212*c*, 212*d*, and 212*e* (collectively, "212"). The spine switches 210 can connect to the leaf switches 212 in the network fabric 202. The leaf switches 212 can include access ports (or non-fabric ports) and fabric ports. The fabric ports can provide uplinks to the spine switches 210, while the access ports can provide connectivity to endpoints (e.g., the servers 208), internal networks (e.g., the L2 network 204), or external networks (e.g., the L3 network 206).

The leaf switches 212 can reside at the edge of the network fabric 202, and can thus represent the physical network edge. For instance, in some embodiments, the leaf switches 212*d* and 212*e* operate as border leaf switches in communication with edge devices 214 located in the external network 206. The border leaf switches 212*d* and 212*e* may be used to connect any type of external network device, service (e.g., firewall, deep packet inspector, traffic monitor, load balancer, etc.), or network (e.g., the L3 network 206) to the fabric 202.

Although the network fabric 202 is illustrated and described herein as an example leaf-spine architecture, one of ordinary skill in the art will readily recognize that various embodiments can be implemented based on any network topology, including any data center or cloud network fabric. Indeed, other architectures, designs, infrastructures, and variations are contemplated herein. For example, the principles disclosed herein are applicable to topologies including three-tier (including core, aggregation, and access levels), fat tree, mesh, bus, hub and spoke, etc. Thus, in some embodiments, the leaf switches 212 can be top-of-rack switches configured according to a top-of-rack architecture. In other embodiments, the leaf switches 212 can be aggregation switches in any particular topology, such as end-of-row or middle-of-row topologies. In some embodiments, the leaf switches 212 can also be implemented using aggregation switches.

Moreover, the topology illustrated in FIG. 2 and described herein is readily scalable and may accommodate a large number of components, as well as more complicated arrangements and configurations. For example, the network may include any number of fabrics 202, which may be geographically dispersed or located in the same geographic area. Thus, network nodes may be used in any suitable network topology, which may include any number of servers, virtual machines or containers, switches, routers, appliances, controllers, gateways, or other nodes interconnected to form a large and complex network. Nodes may be coupled to other nodes or networks through one or more interfaces employing any suitable wired or wireless connection, which provides a viable pathway for electronic communications.

Network communications in the network fabric 202 can flow through the leaf switches 212. In some embodiments, the leaf switches 212 can provide endpoints (e.g., the servers 208), internal networks (e.g., the L2 network 204), or external networks (e.g., the L3 network 206) access to the network fabric 202, and can connect the leaf switches 212 to each other. In some embodiments, the leaf switches 212 can connect endpoint groups (EPGs) to the network fabric 202, internal networks (e.g., the L2 network 204), and/or any external networks (e.g., the L3 network 206). EPGs are groupings of applications, or application components, and tiers for implementing forwarding and policy logic. EPGs can allow for separation of network policy, security, and forwarding from addressing by using logical application boundaries. EPGs can be used in the network environment 200 for mapping applications in the network. For example, EPGs can comprise a grouping of endpoints in the network indicating connectivity and policy for applications.

As discussed, the servers 208 can connect to the network fabric 202 via the leaf switches 212. For example, the servers 208a and 208b can connect directly to the leaf switches 212a and 212b, which can connect the servers 208a and 208b to the network fabric 202 and/or any of the other leaf switches. The servers 208c and 208d can connect to the leaf switches 212b and 212c via the L2 network 204. The servers 208c and 208d and the L2 network 204 make up a local area network (LAN). LANs can connect nodes over dedicated private communications links located in the same general physical location, such as a building or campus.

The WAN 206 can connect to the leaf switches 212d or 212e via the L3 network 206. WANs can connect geographically dispersed nodes over long-distance communications links, such as common carrier telephone lines, optical light paths, synchronous optical networks (SONET), or synchronous digital hierarchy (SDH) links. LANs and WANs can include L2 and/or L3 networks and endpoints.

The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol can refer to a set of rules defining how the nodes interact with each other. Computer networks may be further interconnected by an intermediate network node, such as a router, to extend the effective size of each network. The endpoints 208 can include any communication device or component, such as a computer, server, blade, hypervisor, virtual machine, container, process (e.g., running on a virtual machine), switch, router, gateway, host, device, external network, etc.

In some embodiments, the network environment 200 also includes a network controller running on the host 208a. The network controller is implemented using the Application Policy Infrastructure Controller (APIC™) from Cisco®. The APIC™ provides a centralized point of automation and management, policy programming, application deployment, and health monitoring for the fabric 202. In some embodiments, the APIC™ is operated as a replicated synchronized clustered controller. In other embodiments, other configurations or software-defined networking (SDN) platforms can be utilized for managing the fabric 202.

In some embodiments, a physical server 208 may have instantiated thereon a hypervisor 216 for creating and running one or more virtual switches (not shown) and one or more virtual machines 218, as shown for the host 208b. In other embodiments, physical servers may run a shared kernel for hosting containers. In yet other embodiments, the physical server 208 can run other software for supporting other virtual partitioning approaches. Networks in accordance with various embodiments may include any number of physical servers hosting any number of virtual machines, containers, or other virtual partitions. Hosts may also comprise blade/physical servers without virtual machines, containers, or other virtual partitions, such as the servers 208a, 208c, 208d, and 208e.

The network environment 200 can also integrate a network traffic monitoring system, such as the network traffic monitoring system 100 shown in FIG. 1. For example, the network traffic monitoring system of FIG. 2 includes sensors 220a, 220b, 220c, and 220d (collectively, "220"), collectors 222, and an analytics engine, such as the analytics engine 110 of FIG. 1, executing on the server 208e. The analytics engine 208e can receive and process network traffic data collected by the collectors 222 and detected by the sensors 220 placed on nodes located throughout the network environment 200. Although the analytics engine 208e is shown to be a standalone network appliance in FIG. 2, it will be appreciated that the analytics engine 208e can also be implemented as a virtual partition (e.g., VM or container) that can be distributed onto a host or cluster of hosts, software as a service (SaaS), or other suitable method of distribution. In some embodiments, the sensors 220 run on the leaf switches 212 (e.g., the sensor 220a), the hosts 208 (e.g., the sensor 220b), the hypervisor 216 (e.g., the sensor 220c), and the VMs 218 (e.g., the sensor 220d). In other embodiments, the sensors 220 can also run on the spine switches 210, virtual switches, service appliances (e.g., firewall, deep packet inspector, traffic monitor, load balancer, etc.) and in between network elements. In some embodiments, sensors 220 can be located at each (or nearly every) network component to capture granular packet statistics and data at each hop of data transmission. In other embodiments, the sensors 220 may not be installed in all components or portions of the network (e.g., shared hosting environment in which customers have exclusive control of some virtual machines).

As shown in FIG. 2, a host may include multiple sensors 220 running on the host (e.g., the host sensor 220b) and various components of the host (e.g., the hypervisor sensor 220c and the VM sensor 220d) so that all (or substantially all) packets traversing the network environment 200 may be monitored. For example, if one of the VMs 218 running on the host 208b receives a first packet from the WAN 206, the first packet may pass through the border leaf switch 212d, the spine switch 210b, the leaf switch 212b, the host 208b, the hypervisor 216, and the VM. Since all or nearly all of these components contain a respective sensor, the first packet will likely be identified and reported to one of the collectors 222. As another example, if a second packet is transmitted from one of the VMs 218 running on the host 208b to the host 208d, sensors installed along the data path, such as at the VM 218, the hypervisor 216, the host 208b, the leaf switch 212b, and the host 208d will likely result in capture of metadata from the second packet.

With FIGS. 1 and 2 described, the disclosure now turns to description of example systems and methods for determining attack surface score based on workload information such as open port information, and determine whether to implement a policy based on the attack surface score.

Figure 3:
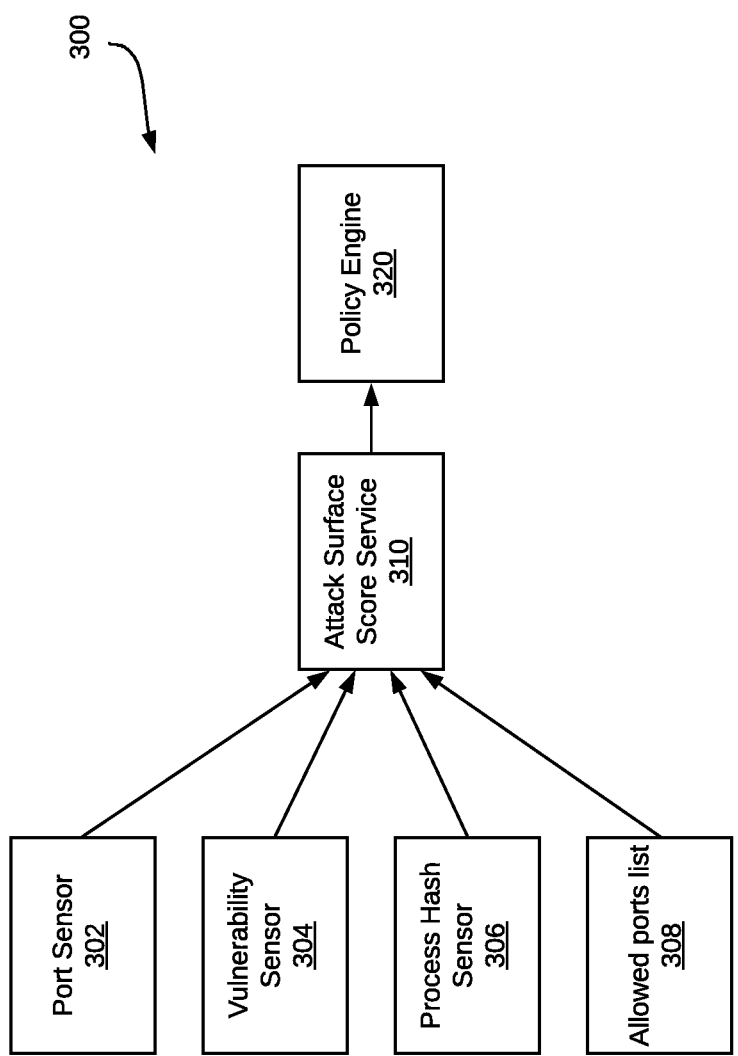
FIG. 3 illustrates an example of an attack surface score determination system, according to one aspect of the present disclosure.

FIG. 3 illustrates an example of an attack surface score determination system 300, according to one aspect of the present disclosure. In some embodiments, the attack surface score determination system 300 can be directed by a network traffic monitoring system, such as the network traffic monitoring system 100 of FIG. 1; an analytics engine, such as the analytics engine 110 of FIG. 1; or other network service or network appliance. For example, an analytics engine 110, an engine 150 or any of engines included therein, can be configured to determine an attack surface score of a workload, select a security policy based on the attack surface score, and implement the selected policy in the workload.

In general, an attack surface score measures how vulnerable a given workload is in light of potential attacks over the network. The attack surface of a workload can be defined as network components where potential network attacks can take place. The attack surface score measures the number of such network components, such as unused open ports, of a workload. The workload can be associated with a specific network application.

The attack surface score can have a range (e.g., 0-10, 0-20, 0-100, etc.) A lower attack surface score may indicate a higher susceptibility of a corresponding workload to potential attacks while a higher attack surface sore may indicate a lower susceptibility of the corresponding workload to potential attacks.

There may be several factors to be considered when determining attack surface score for a workload. First, the attack surface score can be based on the number of open ports on the workload and the number of unused open ports on the workload. For example, higher number of unused open ports compared to the number of open ports can result in a lower attack surface score. Second, the attack surface score can be based on how vulnerable the workload is. For example, having vulnerable packages reside on the workload can result in a lower attack surface score. Third, the attack surface score can be based on blocked process hashes on the workload. For example, inconsistent process hash on the same server can result in a lower attack surface score. Fourth, the attack surface score can be based on an allowed ports list that excludes ports from being considered in the attack surface calculation. For example, even if an allowed ports list can impact the overall attack surface score under other factors, it will not be considered in the attack surface score determination.

As shown in FIG. 3, port sensor 302, vulnerability sensor 304, process hash sensor 306, and allowed ports list 308 can provide data to the attack surface score service 310. Each of these components provides corresponding data on one of the factors for attack surface score determination as described above.

The port sensor 302 can collect data regarding open ports of a given workload. Specifically, port sensor 302 can collect data regarding the number of total open ports of the workload, the number of unused open ports of the workload, and a list of all open ports of the workload with and without data traffic. The unused open ports can be defined as any port with no traffic over a period of time. For example, unused open ports can be any port with no traffic over the past 2 weeks. In some embodiments, port sensor 302 can also generate a list of well-known ports for network attacks. For example, the list can include the port with TCP port number 8080 as one of the well-known ports for network attacks. In some embodiments, port sensor 302 can collect such list from other sources. In some embodiments, port sensor 302 collects the above described data periodically. For example, it can collect the data by minute, hourly, daily, weekly, monthly, quarterly, annually, etc. In some embodiments, some or all functions of port sensor 302 can be performed by either sensor 104 or 220.

The vulnerability sensor 304 can collect data regarding the vulnerability of a given workload. Specifically, the package sensor 304 collects data on the impact of known security flaws of vulnerable packages on the workload. For example, such known security flaws can be any flaw from the Common Vulnerability and Exposures (CVE), which is a list of publicly disclosed cybersecurity security flaws. In some embodiments, Common Vulnerability Scoring System (CVSS) score is being utilized to assess such CVE. The CVSS score measures the severity of CVE of the packages on a workload.

The process hash sensor 306 can collect data regarding the blocked process hashes on the workload. Specifically, such data includes process binary hash or file hash consistency across a workload. In some embodiments, the process hash sensor 306 can identify inconsistency of the process hashes of a workload, and the abnormal process hash will be included in a blocked process hash database. For example, all servers of a web server farm running APACHE cloned form the same setup configuration are expected to have the same hash for httpd binaries, which indicate that the process binary hash consistency for the servers is high. On the contrary, one or a few of the servers having different hash for httpd binaries would indicate that the process binary hash consistency for the servers is low. In this example, if any server is running APACHE with an older version, it can be considered as malicious and be included in the blocked process hash database. In another example, a malware may impersonate a valid file name (e.g., word.exe). A signed file name (process hash) of the valid file name (e.g., word.exe) would be different than the file name of the malware impersonating the valid file. This discrepancy may be detected by comparing the file names against a standard/publicly accessible database of valid process hashes. An invalid process hash or file name may then be added to the list of blocked process hashes.

The allowed ports list 308 is a database to store ports that are excluded from the attack surface score determination. In some embodiments, such allowed ports list 308 stores the port numbers to indicate each port. A system operator can input such port numbers for ports based on the specific need of the enterprise network, via an API such as API 160. For example, the system operator can input a port that is designed to communicate with a client once every month. In this example, the port might be considered as an unused open port between the monthly communication, and affect the number of unused open ports and total number of open ports collected by the port sensor 302. However, by including such port number in the allowed ports list 308, the system operator can exclude such port from the attack surface score determination.

After port sensor 302, vulnerability sensor 304, process hash sensor 306, and allowed ports list 308 provide corresponding data as described above, the attack surface score service 310 can determine an attack surface score for the workload. According to some embodiments, the attack surface score service 310 may be a set of computer-readable instructions that can be executed by engines 150 or its components to calculate a corresponding score.

The attack surface score service 306 can calculate an attack surface score for either a host or a workload. Specifically, the attack surface score can be a function of unused open ports relative to total ports of a host or a workload, with a smoothing factor being applied. In this example, open ports without any traffic over the past two weeks are considered "unused open ports." Among the unused open ports, some ports have a higher potential risk of being under attack, such as well-known ports that have been used in past attacks.

In some embodiments, the following formula 1 can be used to determine the attack surface score.

$$\text{attack surface score} = \frac{\partial + \Sigma \text{ unused open ports}}{\partial + \Sigma \text{ open ports} + (\rho * \Sigma \text{ unused common attack ports})} \quad (1)$$

In this formula 1, a represents a smoothing factor that can be predetermined by the network traffic monitoring system 100 or its system operator; p represents a penalty factor which can also be predetermined by the network traffic monitoring system 100 or its system operator. Unused open ports represents the number of unused open ports. Open ports represents the number of open ports. Unused common attack ports represents the number of well-known ports that have been used in past attacks. For example, having such unused common attack ports can add extra penalty via p to the final attack surface score.

In some embodiments, the following formula 2 can be used to determine the attack surface score.

$$\text{Attack surface score} = \frac{\alpha + \Sigma \text{ unused open ports}}{\alpha + \Sigma \text{ open ports} + (\rho * \Sigma \text{ unused common attack ports}) + f_v(\text{vulnerability } pkgs)} \quad (2)$$

$$f_v = \max\left(\left\{cve_{score} = \begin{cases} CVSS_{V3}, & v3 \text{ exist} \\ CVSS_{V2}, & v3 \text{ not exist} \end{cases}\right\}\right)$$

In this formula 2, a and p represent the same factors as described above regarding formula 1. Unused open ports, open ports, and unused common attack ports represent the same numbers as described above regarding formula 1. The $f_v$(vulnerability pkgs) is a function of CVSS score for packages with CVEs that reside on the workload. A higher CVSS score indicates a more severe vulnerability on the workload, and will in turn result in a lower overall attack surface score. In some embodiments, when there are multiple CVEs exist on a given workload, the highest CVSS score of the most severe CVE can be used for this calculation. There are different versions of CVSS score, and the most recent version can be utilized when it is available. For example, when both CVSS version 2 score and CVSS version 3 score is available for a CVE, the CVSS version 3 score will be utilized first. In some embodiments, formula 2 also take into consideration of the blocked process hash. For example, the blocked process hash can be managed by the vulnerability sensor 304. If a workload includes open ports that are included in the blocked process hash database, then the workload can get an overall attack surface score of 0.

The above formula 1 and 2 can be used to determine a workload or application level score. An attack surface score can also include a host level score for the host on which the workload/application is being executed. In other words, an attack surface score can be calculated taking into consideration host level details, per the following formula 3.

$$\text{Attack surface score} = W_p \frac{\alpha + \Sigma \text{ unused open ports}}{\alpha + \Sigma \text{ open ports} + (\rho * \Sigma \text{ unused common attack ports}) + f_v(\text{vulnerability } pkgs)} + \quad (3)$$

$$W_h(\text{host level vulnerability score})$$

In this formula 3, a and p represent the same factors as described above regarding formula 1. Unused open ports, open ports, and unused common attack ports represent the same numbers as described above regarding formula 1. In some embodiments, unused open ports, open ports, and unused common attack ports can include the total corresponding number of all workloads on the host. In some embodiments, unused open ports, open ports, and unused common attack ports can include an average of corresponding numbers of all workloads on the host. The $f_v$(vulnerability pkgs) represents the same function as described above regarding formula 2. In some embodiments, $f_v$(vulnerability pkgs) can represent a total of all CVSS scores for packages with CVEs that reside on all workloads of the host. In some embodiments, $f_v$(vulnerability pkgs) can represent an average CVSS score for all packages with CVEs that reside on all workloads of the host. $W_p$ is a weight factor of open ports. For example, $W_p$ can be adjusted depending on whether a total number of an average number is being used for the above numbers. $W_h$, is a weight factor of the host.

The host level vulnerability score can measure the impact of known security flaws of vulnerable packages on all workloads of a host. The data utilized for such score can be collected by the vulnerability sensor 304 as described above. In some embodiments, a total of all CVE scores of vulnerable packages on all workloads of a host can be used as the host level vulnerability score. In some embodiments, an average score of all CVE scores of vulnerable packages on all workloads of a host can be used as the host level vulnerability score.

When calculating the host level vulnerability score, other factors such as the vendor data can also be considered. In some embodiments, the network traffic monitoring system 100 or its system operator can adjust the final host level vulnerability score when there is an anomaly in the vendor data. For example, for some new vulnerabilities, it is common to have certain vendor data missing or inaccurate, and such adjustment of the final vulnerability score could be performed. In some embodiments, the vendor data of a given vulnerability can be updated periodically, such as every 24 hours. In some embodiments, the final host level vulnerability score is inverse proportional to the severity of the CVSS score of the given vulnerability.

In some embodiments, the attack surface score service 306 can also calculate an attack surface score for a host by using the average of the attack surface scores of workloads that are placed onto the host.

In some embodiments, other formulae can be used to determine the attack surface score. For example, weight and value can be assigned to represent the ports that are included in the blocked process hash database.

Once the attack surface score service 310 completes the determination of an attack surface score for a workload or a host, it can transfer the attack surface score to the policy engine 320. The policy engine 320 can select and implement security policy accordingly. Some examples of the security policies include, but not limited to closing the unused open ports. Such security policies can further improve the attack surface score for a workload or a host.

Figure 4:
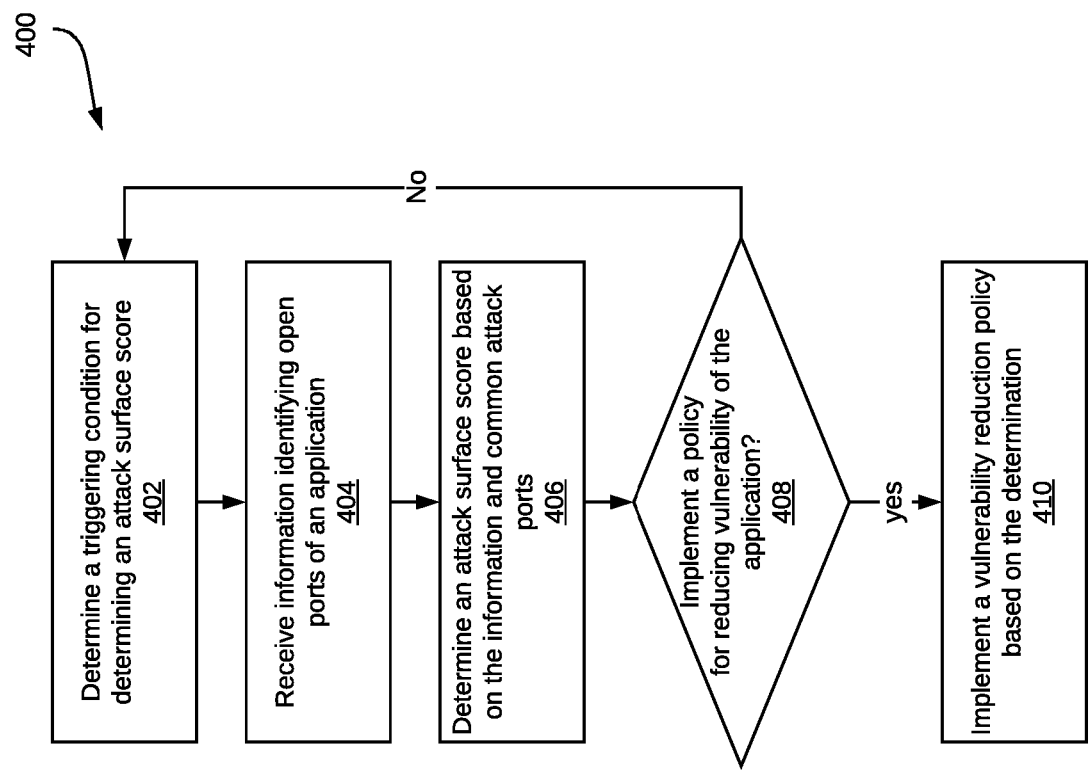
FIG. 4 illustrates an example of a method for determining attack surface score and implement security policy based on the attack surface score, according to one aspect of the present disclosure.

FIG. 4 illustrates an example of a method 400 for determining attack surface score and implement security policy based on the attack surface score, according to one aspect of the present disclosure. FIG. 4 may be from the perspective of attack surface score service 310 and policy engine 320. However, it will be understood that the attack surface score service 310 and policy engine 320 may be implemented by analytics engine 110 of FIG. 1, where analytics engine 110 may execute a set of computer-readable instructions stored on one or more associated memories to implement the processes of FIG. 4 described below. Accordingly, FIG. 4 will be described from the perspective of analytics engine 110. Furthermore, FIG. 4 will be described with reference to FIGS. 1-3.

At S402, analytics engine 110 determines a triggering condition for determining an attack surface score for one or more workloads/applications. In one example, such triggering condition may be the receipt of a request for determining the attack surface score along with identification information of the one or more workloads/applications for which the attack surface score is/are to be determined. Such request may be received via an API 160/network controller 114 of FIG. 1. In another example, such triggering condition can be an expiration of a time period. In other words, determining an attack surface score may be a periodic process for any given workload/application on an enterprise network such as network 200. Therefore, the process may be implemented every predetermined period of time for any given workload/application. Periodicity of such process may be a configurable parameter determined based on experiments and/or empirical studies.

At S404, analytics engine 110 receives information identifying open ports associated with an application (e.g., identified via triggering condition at S402). In some embodiments, the attack surface score service 310 can receive data collected from port sensor 302, vulnerability sensor 304, process hash sensor 306, and allowed ports list 308 as described above with regard to FIG. 3.

At S406, analytics engine 110 determines an attack surface score for the application based on the above collected information and common attack ports. In some embodiments, the attack surface score service 310 can determine the attack surface score as described with regard to FIG. 3. Specifically, one of the formulae 1, 2, or 3 described above can be used to determine the attack surface score.

At S408, analytics engine 110 determines whether to implement a network security policy for an application/workload for which an attack surface score is determined at S404, to yield a determination. In some embodiments, analytics engine 110 first determines whether to implement any policy based on the attack surface score and other information. Specifically, the other information can include a user input indicating an attack surface score above 80 (a threshold) is satisfactory based on the specific need of an application in an enterprise network. If the determined attack surface score at S404 is above 80, the policy engine 320 can determine not to implement any policies to such application.

If the determined attack surface score at S404 equals to or is below 80, the policy engine 320 can determine to implement security policies based on collected data. An example of such security polices can be closing one or more open ports of the application. The threshold may be a configurable parameter determined based on experiments and/or empirical studies.

If at S408, analytics engine 110 determines that a policy for reducing vulnerability of the corresponding application/workload is to be implemented, then at S410, analytics engine 110 implements a vulnerability reduction policy based on the determination. In some embodiments, analytics engine 110 (by implementing functionalities of the policy engine 320) can implement a vulnerability reduction policy on the application. For example, analytics engine 110 can implement a security policy that deletes or quarantine packages associated with a CVE. In another example, analytics engine 110 can implement a security policy that closes one or more open ports. In this example, the attack surface score determination system 300 can collect updated information of the application after the implementation of such security policy, and determine an updated attack surface score based on the updated information. Thereafter, the process may proceed to step S412 where details of determination of attack surface score may be presented via an API such as API 500 of FIG. 5 or API 160 of FIG. 1 for a network operator to view/interact with. Thereafter, the process reverts back to S402 and analytics engine 110 may repeat S402 to S410 as described above.

Referring back to S408, if analytics engine 110 determines that a policy for reducing vulnerability of the corresponding application/workload need not be the process reverts back to S400 and analytics engine 110 may repeat S402 to S410 as described above.

Figure 5:
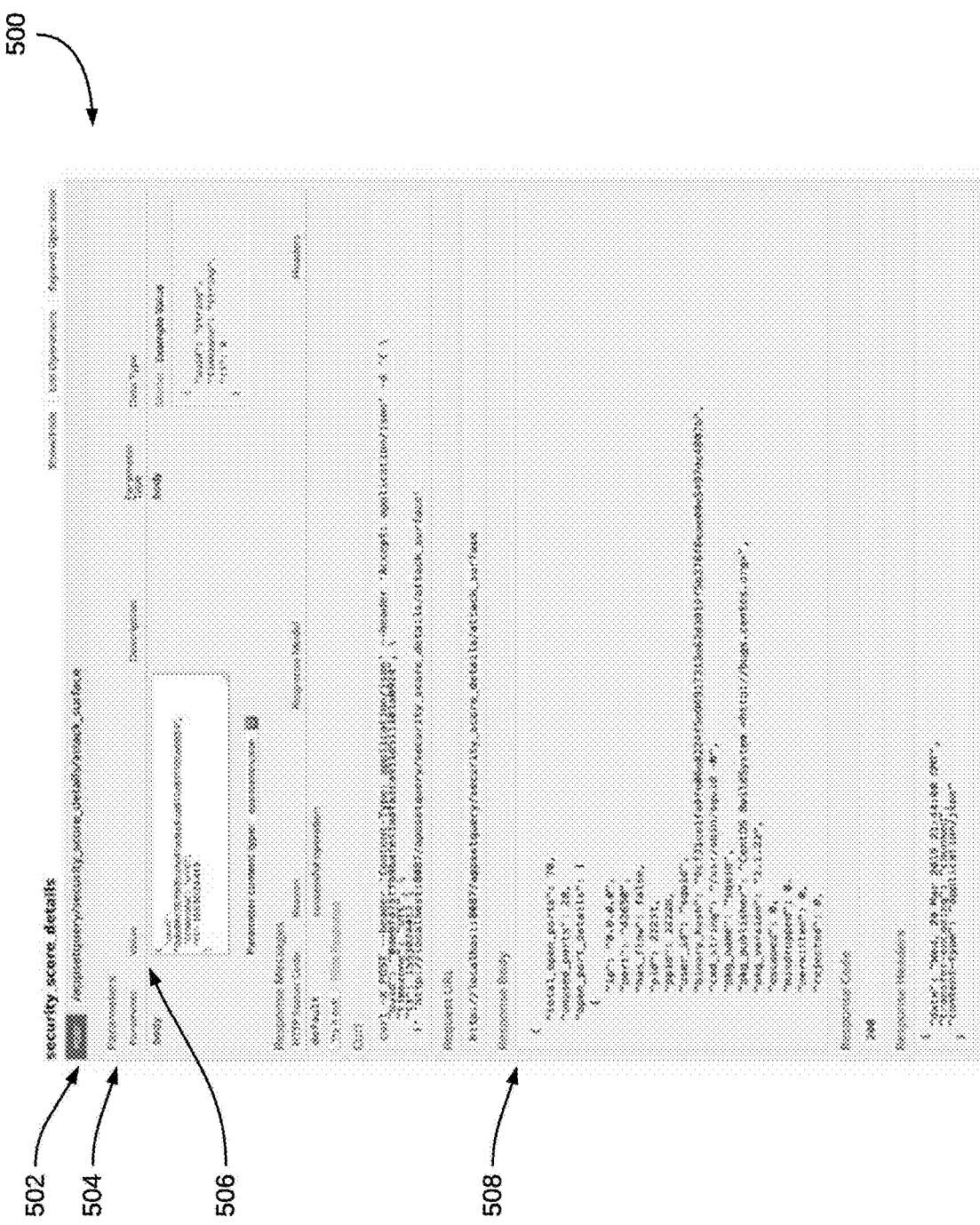
FIG. 5 illustrates and example of an Application Programing Interface (API) for retrieving attack surface details, according to one aspect of the present disclosure.

FIG. 5 illustrates an example of an API for retrieving attack surface details, according to one aspect of the present disclosure. However, it will be understood that the example API 500 including details of determination of attack surface score can be presented after S410 of example method 400 for a network operator to view/interact with. The attack surface score service 310, policy engine 320, and the analytics engine 110 may be implemented as the API server of API 500 and provide related information for API 500 to present. API 500 can also be implemented similar to the API 160 of FIG. 1.

In the POST section 502, a request is presented to send data to the API server to create or update a resource. In this example, the request for the details for determining the attack surface score is presented.

In the Parameters subsection 504 of the POST section 502, a network operator can input identifying information of a workload to request the attack surface score information. In this example, a network operator input a Universally Unique Identifier (UUID) and time zone information of a workload in the Value input box 506.

In the Response Body subsection 508 of the POST section 502, an API server presents the detail information for determining the attack surface score. In this example, the API server presents the total number of open ports, the number of unused open ports, and the open port details of the workload indicated by the network operator in the Value input box 506. The open port details of the workload includes other details for determining the attack surface score, such as IP of the open port, CVE information of the open port, and whether the open port is being included in an allowed ports list, etc. Based on this detailed information, the system operator can determine what causes a workload to have low attack surface score, and find the according solution to improve the attack surface score more efficiently.

With examples of a network monitoring system, a network environment and an attack surface score determination system described with reference to FIGS. 1-5, the disclosure now turns to FIGS. 5A and 5B for description of example system architectures for implementing analytics engine 110 and/or other components of systems described above.

Figure 6A:
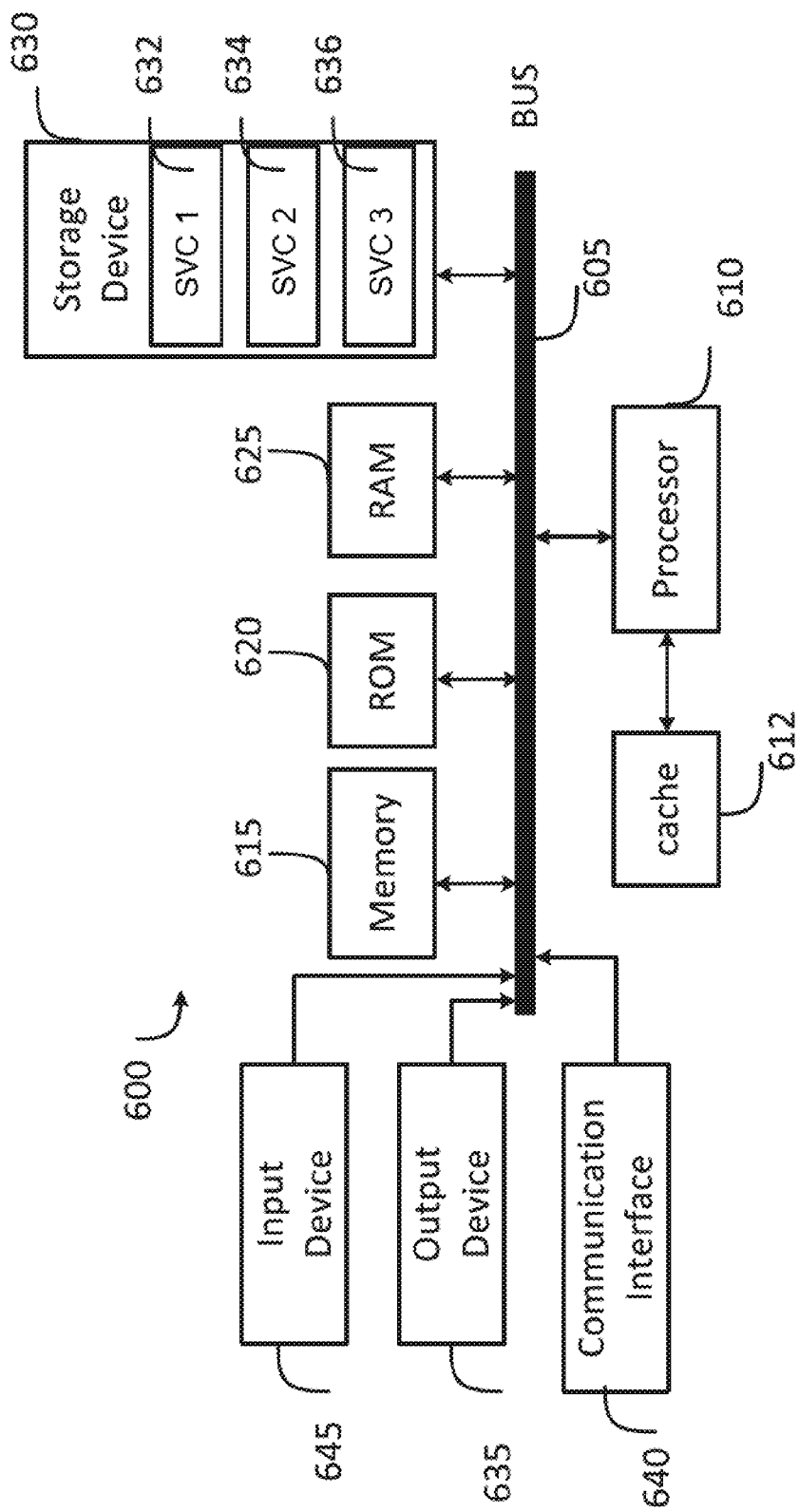
FIGS. 6A and 6B illustrate examples of systems, according to one aspect of the present disclosure.
Figure 6B:
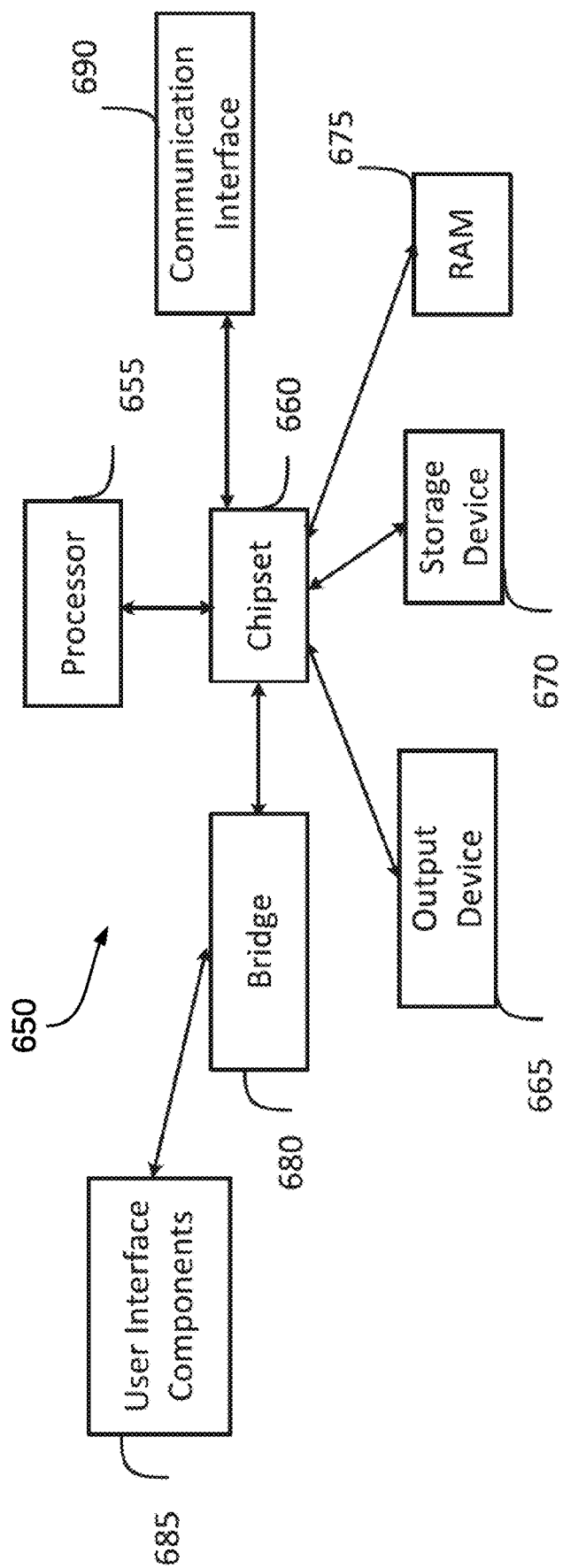

FIG. 6A and FIG. 6B illustrate systems, according to one aspect of the present disclosure. The more appropriate system will be apparent to those of ordinary skill in the art when practicing the various embodiments. Persons of ordinary skill in the art will also readily appreciate that other systems are possible.

FIG. 6A illustrates a conventional system bus computing system architecture 600 wherein the components of the system are in electrical communication with each other using a bus 605. Exemplary system 600 includes a processing unit (CPU or processor) 610 and a system bus 605 that couples various system components including the system memory 615, such as read only memory (ROM) 670 and random access memory (RAM) 675, to the processor 610. The system 600 can include a cache of high-speed memory connected directly with, in close proximity to, or integrated as part of the processor 610. The system 600 can copy data from the memory 615 and/or the storage device 630 to the cache 612 for quick access by the processor 610. In this way, the cache can provide a performance boost that avoids processor 610 delays while waiting for data. These and other modules can control or be configured to control the processor 610 to perform various actions. Other system memory 615 may be available for use as well. The memory 615 can include multiple different types of memory with different performance characteristics. The processor 610 can include any general purpose processor and a hardware module or software module, such as module 1 637, module 2 634, and module 3 636 stored in storage device 630, configured to control the processor 610 as well as a special-purpose processor where software instructions are incorporated into the actual processor design. The processor 610 may essentially be a completely self-contained computing system, containing multiple cores or processors, a bus, memory controller, cache, etc. A multi-core processor may be symmetric or asymmetric.

To enable user interaction with the computing device 600, an input device 645 can represent any number of input mechanisms, such as a microphone for speech, a touch-sensitive screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with the computing device 600. The communications interface 640 can generally govern and manage the user input and system output. There is no restriction on operating on any particular hardware arrangement and therefore the basic features here may easily be substituted for improved hardware or firmware arrangements as they are developed.

Storage device 630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 675, read only memory (ROM) 680, and hybrids thereof.

The storage device 630 can include software modules 638, 634, 636 for controlling the processor 610. Other hardware or software modules are contemplated. The storage device 630 can be connected to the system bus 605. In one aspect, a hardware module that performs a particular function can include the software component stored in a computer-readable medium in connection with the necessary hardware components, such as the processor 610, bus 605, display 635, and so forth, to carry out the function.

FIG. 6B illustrates an example computer system 650 having a chipset architecture that can be used in executing the described method and generating and displaying a graphical user interface (GUI). Computer system 650 is an example of computer hardware, software, and firmware that can be used to implement the disclosed technology. System 650 can include a processor 655, representative of any number of physically and/or logically distinct resources capable of executing software, firmware, and hardware configured to perform identified computations. Processor 655 can communicate with a chipset 660 that can control input to and output from processor 655. In this example, chipset 660 outputs information to output 665, such as a display, and can read and write information to storage device 670, which can include magnetic media, and solid state media, for example. Chipset 660 can also read data from and write data to RAM 675. A bridge 680 for interfacing with a variety of user interface components 685 can be provided for interfacing with chipset 660. Such user interface components 685 can include a keyboard, a microphone, touch detection and processing circuitry, a pointing device, such as a mouse, and so on. In general, inputs to system 650 can come from any of a variety of sources, machine generated and/or human generated.

Chipset 660 can also interface with one or more communication interfaces 690 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 655 analyzing data stored in storage 670 or 675. Further, the machine can receive inputs from a user via user interface components 685 and execute appropriate functions, such as browsing functions by interpreting these inputs using processor 655. It can be appreciated that example systems 600 and 650 can have more than one processor 610 or be part of a group or cluster of computing devices networked together to provide greater processing capability.

It will be appreciated that computing systems 500 and 550 can have more than one processor 510 and 555, respectively, or be part of a group or cluster of computing devices networked together to provide greater processing capability.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware, and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A method comprising:
   receiving information identifying open ports associated with an application;
   determining based on the information and common attack ports, an attack surface score for, and specific to, a workload of the application;
   determining, based on the attack surface score, whether to implement a policy for reducing vulnerability of the application to attacks to yield a determination;
   implementing a vulnerability reduction policy based on the determination;
   closing one or more open ports to yield updated information on open ports associated with the application; and
   determining an updated attack surface score based on the updated information.

2. The method of claim 1, wherein the information includes identification of open ports and unused open ports associated with the workload of the application, a vulnerability score of the workload of the application, a process hash evaluation of the workload of the application, and an allowed ports list of the application.

3. The method of claim 1, wherein the determining the attack surface score is based on the information and one or more unused ports from the common attack ports.

4. The method of claim 1, wherein the open ports are TCP transport layer ports.

5. The method of claim 1, wherein the information includes blocked process hashes on the workload of the application.

6. The method of claim 1, wherein the determining the attack surface score excludes consideration of allowed ports.

7. A device comprising:
   one or more memories having computer-readable instructions stored therein; and
   one or more processors configured to execute the computer-readable instructions to:
      receive information identifying open ports associated with an application;
      determine based on the information and common attack ports, an attack surface score for, and specific to, a workload of the application;
      determine whether to implement a policy for reducing vulnerability of the application to attacks to yield a determination based on the attack surface score;
      implement a vulnerability reduction policy based on the determination;
   close one or more open ports to yield updated information on open ports associated with the application; and
   determine an updated attack surface score based on the updated information.

8. The device of claim 7, wherein the information includes identification of open ports and unused open ports associated with the workload of the application, a vulnerability score of the workload of the application, a process hash evaluation of the workload of the application, and an allowed ports list of the application.

9. The device of claim 7, wherein execution of the instructions by the one or more processors further cause the one or more processors to:
   close one or more open ports to yield updated information on open ports associated with the application; and
   determine an updated attack surface score based on the updated information.

10. The device of claim 7, wherein the open ports are TCP transport layer ports.

11. The device of claim 7, wherein the information includes blocked process hashes on the workload of the application.

12. The device of claim 7, wherein the determine the attack surface score excludes consideration of allowed ports.

13. A non-transitory computer-readable storage medium comprising computer-readable instructions which, when executed by one or more processors, cause the one or more processors to:
   receive information identifying open ports associated with an application;
   determine based on the information and common attack ports, an attack surface score for, and specific to, a workload of the application;
   determine whether to implement a policy for reducing vulnerability of the application to attacks to yield a determination; and
   implement a vulnerability reduction policy based on the determination;

close one or more open ports to yield updated information on open ports associated with the application; and determine an updated attack surface score based on the updated information.

14. The non-transitory computer-readable storage medium of claim 13, wherein information includes identification of open ports and unused open ports associated with the workload of the application, a vulnerability score of the workload of the application, a process hash evaluation of the workload of the application, and an allowed ports list of the application.

15. The non-transitory computer-readable storage medium of claim 13, wherein the execution of the computer-readable instructions by the one or more processors, cause the one or more processors to determine the attack surface score based on the information and one or more unused ports from the common attack ports.

16. The non-transitory computer-readable storage medium of claim 13, wherein the open ports are TCP transport layer ports.

17. The medium of claim 15, wherein the information includes blocked process hashes on the workload of the application.

\* \* \* \* \*